US009170065B2

(12) United States Patent
Canterbury

(10) Patent No.: US 9,170,065 B2
(45) Date of Patent: Oct. 27, 2015

(54) POCKET HUNTING SYSTEM

(71) Applicant: Jimmy Canterbury, Indianapolis, IN (US)

(72) Inventor: Jimmy Canterbury, Indianapolis, IN (US)

(73) Assignee: The Pathfinder School LLC, Indianapolis, IN (US)

( * ) Notice: Subject to any disclaimer, the term of this patent is extended or adjusted under 35 U.S.C. 154(b) by 283 days.

(21) Appl. No.: 13/670,888

(22) Filed: Nov. 7, 2012

(65) Prior Publication Data

US 2013/0333680 A1    Dec. 19, 2013

(51) Int. Cl.
*F41B 3/02*      (2006.01)
*A01K 91/02*    (2006.01)
*F41B 7/00*      (2006.01)
*F41B 5/00*      (2006.01)
*F41B 5/14*      (2006.01)

(52) U.S. Cl.
CPC . *F41B 3/02* (2013.01); *A01K 91/02* (2013.01); *F41B 5/0094* (2013.01); *F41B 5/143* (2013.01); *F41B 7/00* (2013.01)

(58) Field of Classification Search
CPC .............. F41B 3/02; F41B 5/14; A01K 91/02
USPC .......... 124/17, 20.1, 20.3, 22, 86, 87
See application file for complete search history.

(56) References Cited

U.S. PATENT DOCUMENTS

| | | | | |
|---|---|---|---|---|
| 844,665 | A * | 2/1907 | Dills | 124/20.1 |
| 2,600,524 | A * | 6/1952 | Fernsel | 124/20.1 |
| 2,613,659 | A * | 10/1952 | Hutson | 124/20.3 |
| 2,715,895 | A * | 8/1955 | Loveless | 124/20.3 |
| 2,808,043 | A * | 10/1957 | Lombard | 43/19 |
| 3,018,770 | A * | 1/1962 | Saunders | 124/20.3 |
| 3,306,278 | A * | 2/1967 | Spatari | 124/22 |
| 3,517,657 | A * | 6/1970 | Alban | 124/20.3 |
| 3,614,947 | A * | 10/1971 | Feldman | 124/20.3 |
| 3,724,800 | A | 4/1973 | Rubin et al. | |
| 3,728,996 | A * | 4/1973 | Miller | 124/20.3 |
| D231,674 | S | 5/1974 | Jimenez | |
| 3,865,094 | A * | 2/1975 | Sweeney | 124/20.1 |
| 3,901,209 | A * | 8/1975 | Woolsey et al. | 124/20.1 |
| D248,309 | S | 6/1978 | Weast | |
| 4,198,949 | A * | 4/1980 | Cook | 124/20.1 |
| 4,250,861 | A * | 2/1981 | Ellenburg | 124/20.1 |
| 4,273,094 | A * | 6/1981 | Hogan | 124/20.1 |
| 4,307,699 | A * | 12/1981 | Cuesta | 124/22 |
| 4,437,449 | A * | 3/1984 | Attanasio | 124/22 |
| 4,573,445 | A * | 3/1986 | Webb et al. | 124/22 |
| 4,587,943 | A * | 5/1986 | Ross | 124/20.1 |
| 4,593,673 | A * | 6/1986 | Kees | 124/20.3 |
| 4,771,756 | A * | 9/1988 | Miles | 124/22 |
| 4,873,963 | A * | 10/1989 | Lemmen | 124/20.3 |
| 4,877,007 | A * | 10/1989 | Olson | 124/22 |
| 4,907,567 | A * | 3/1990 | Henrich | 124/89 |
| 5,243,955 | A * | 9/1993 | Farless | 124/20.1 |
| 5,279,276 | A * | 1/1994 | Nagel et al. | 124/20.1 |
| 5,363,584 | A * | 11/1994 | Lo | 43/19 |
| 5,493,807 | A * | 2/1996 | Sullins | 43/19 |
| 5,579,751 | A * | 12/1996 | Lin | 124/20.1 |

(Continued)

*Primary Examiner* — Alexander Niconovich
(74) *Attorney, Agent, or Firm* — D'Hue Law LLC; Cedric A. D'Hue

(57) ABSTRACT

A slingshot adapter hunting tool including a slingshot adapter and a method of shooting an arrow are disclosed. The slingshot adapter includes a plastic body which defines an open orifice and protrusions defining sight markers, where the tips of the protrusions define the open portion of the orifice.

21 Claims, 8 Drawing Sheets

(56) References Cited

U.S. PATENT DOCUMENTS

| | | | |
|---|---|---|---|
| 5,762,056 A * | 6/1998 | Kysilka | 124/20.3 |
| 5,803,067 A * | 9/1998 | Ellenburg et al. | 124/20.1 |
| 5,894,672 A * | 4/1999 | Ellenburg et al. | 33/265 |
| 6,209,531 B1 * | 4/2001 | Boon | 124/20.1 |
| 6,286,495 B1 * | 9/2001 | Brown | 124/20.1 |
| 6,418,632 B1 * | 7/2002 | Kalfayan | 33/265 |
| D471,615 S * | 3/2003 | Kysilka | D22/107 |
| 6,564,787 B1 * | 5/2003 | Barry | 124/20.1 |
| 6,786,213 B1 * | 9/2004 | Lee | 124/20.1 |
| 6,968,835 B2 * | 11/2005 | Lee | 124/20.1 |
| 7,059,314 B1 * | 6/2006 | Teague | 124/20.3 |
| 7,506,642 B2 * | 3/2009 | Edwards | 124/20.1 |
| 8,302,318 B2 * | 11/2012 | Saunders | 33/227 |
| D679,358 S * | 4/2013 | Canterbury | D22/107 |
| 2003/0034019 A1 * | 2/2003 | Lewis | 124/20.1 |
| 2005/0172944 A1 * | 8/2005 | Lee | 124/20.1 |
| 2008/0295816 A1 * | 12/2008 | Edwards | 124/20.3 |
| 2010/0263649 A1 * | 10/2010 | Fields | 124/17 |
| 2011/0232617 A1 * | 9/2011 | Raymond | 124/20.1 |
| 2012/0037137 A1 * | 2/2012 | Thurmon | 124/20.3 |
| 2012/0160224 A1 * | 6/2012 | Walterscheid | 124/20.1 |
| 2012/0279482 A1 * | 11/2012 | Harris | 124/20.1 |
| 2013/0055994 A1 * | 3/2013 | Walterscheid | 124/20.1 |
| 2013/0192572 A1 * | 8/2013 | Shirk, II | 124/20.1 |
| 2014/0165981 A1 * | 6/2014 | Lien | 124/20.3 |
| 2014/0283803 A1 * | 9/2014 | Maccarrick | 124/20.3 |

* cited by examiner

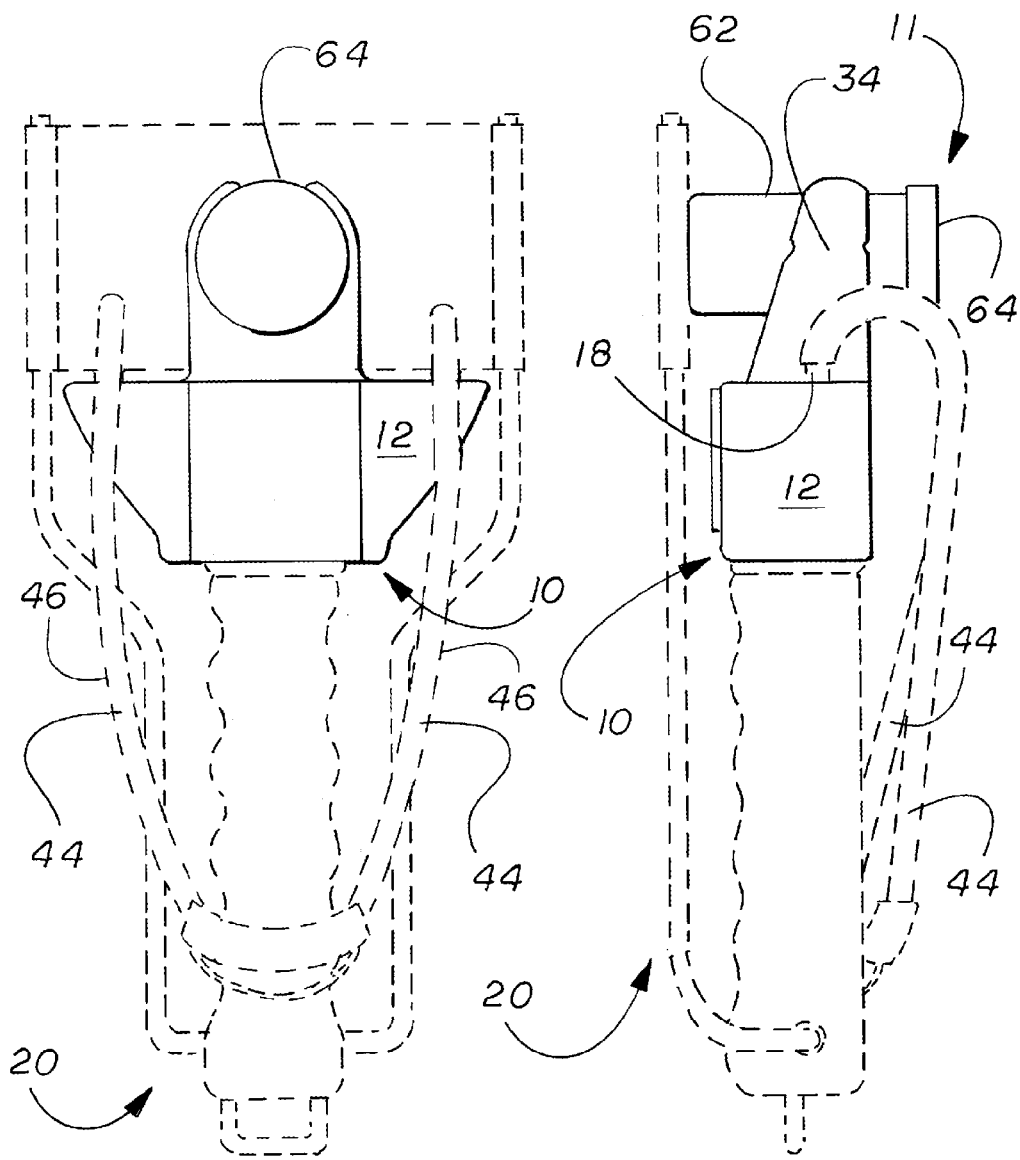

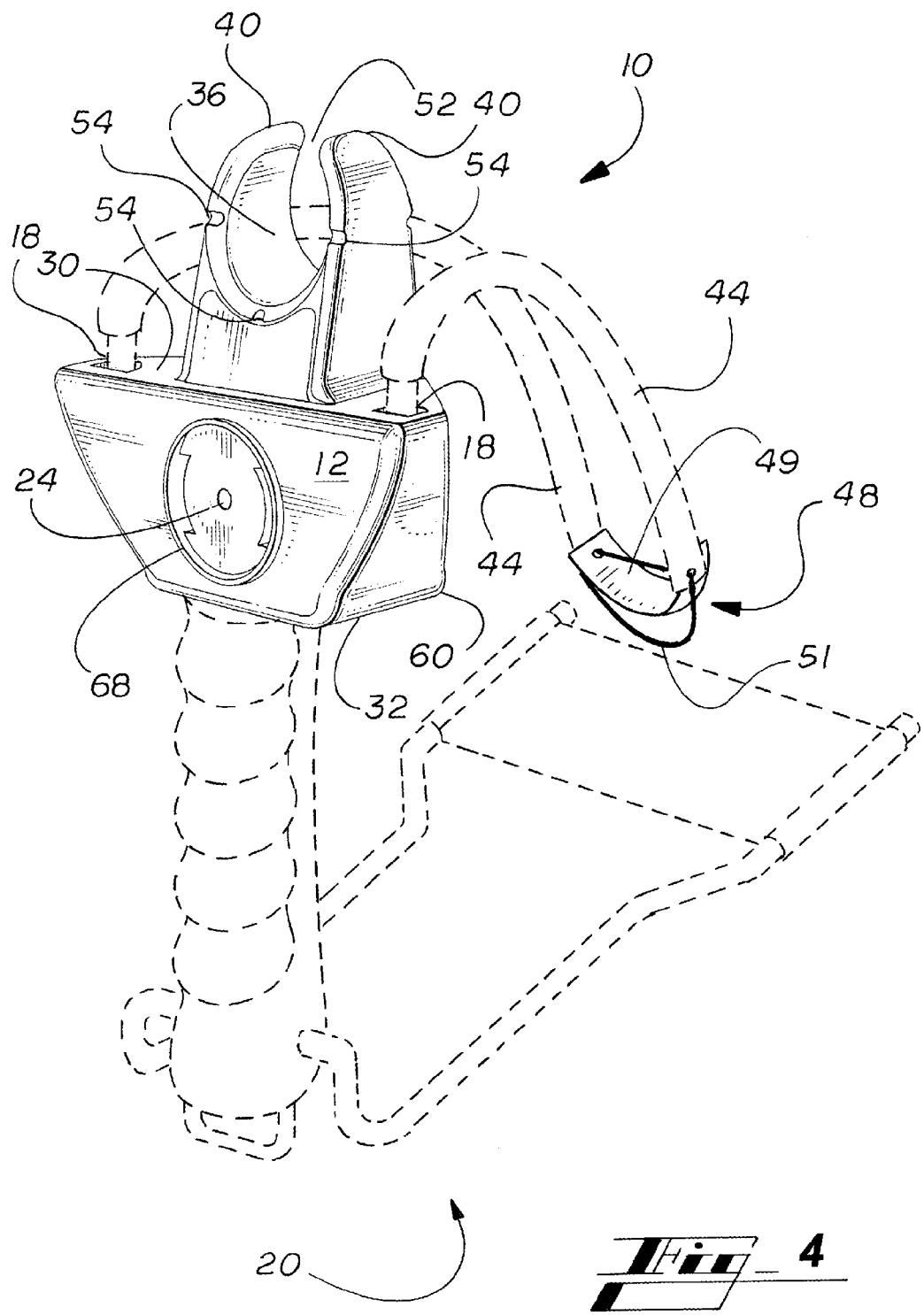

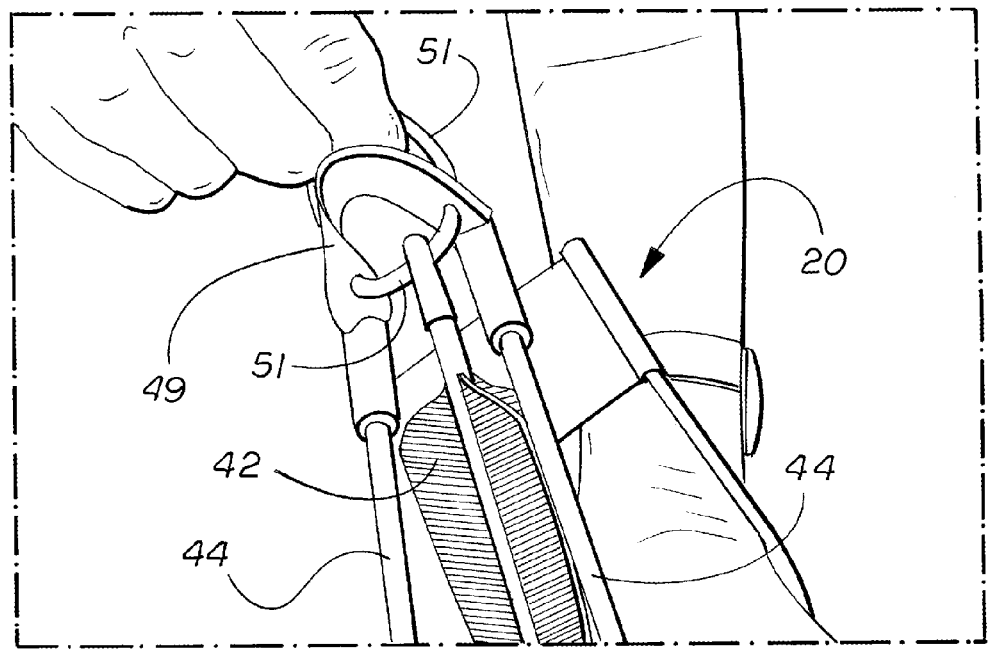
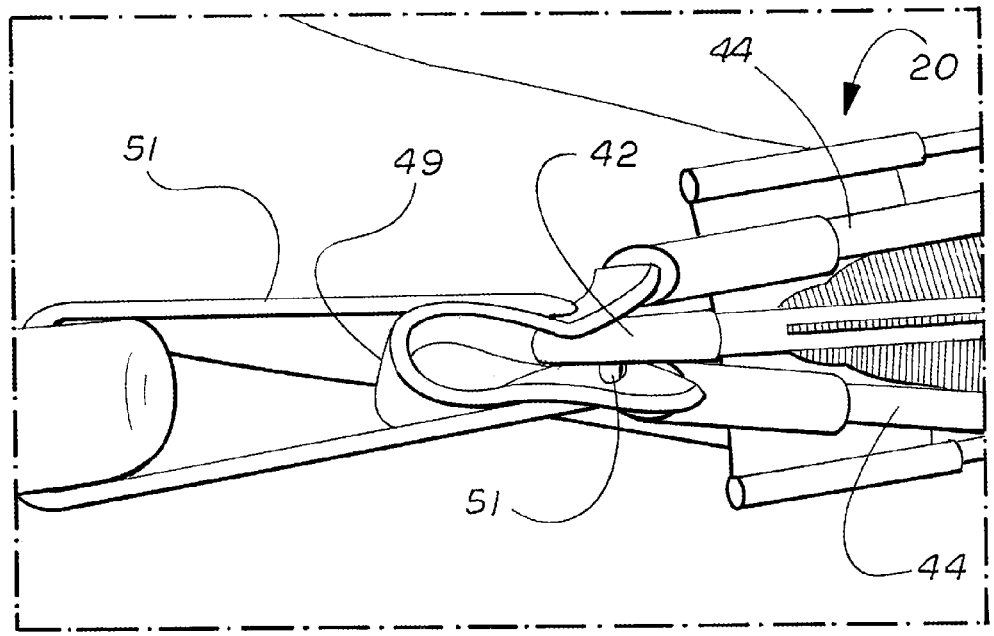

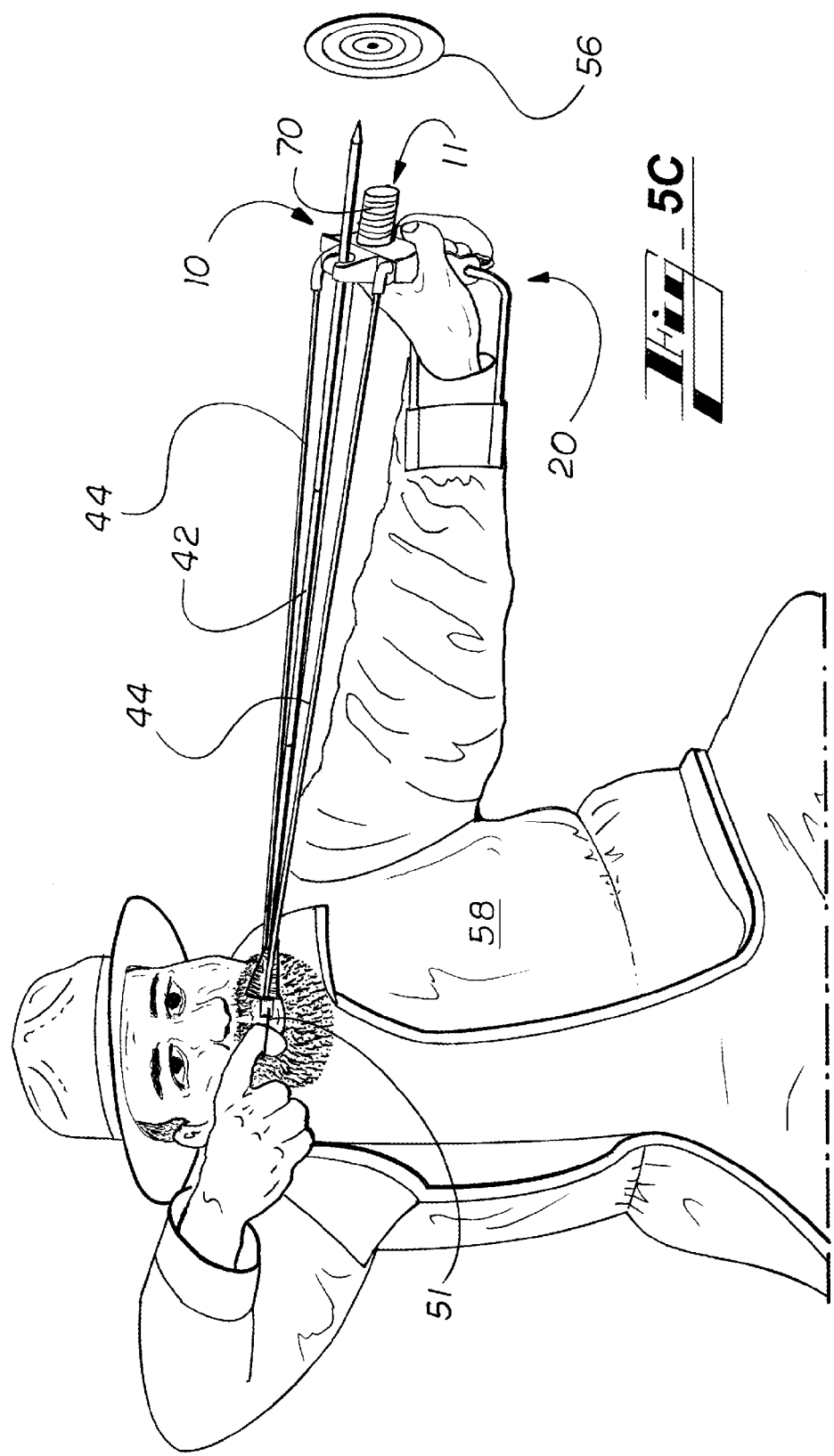

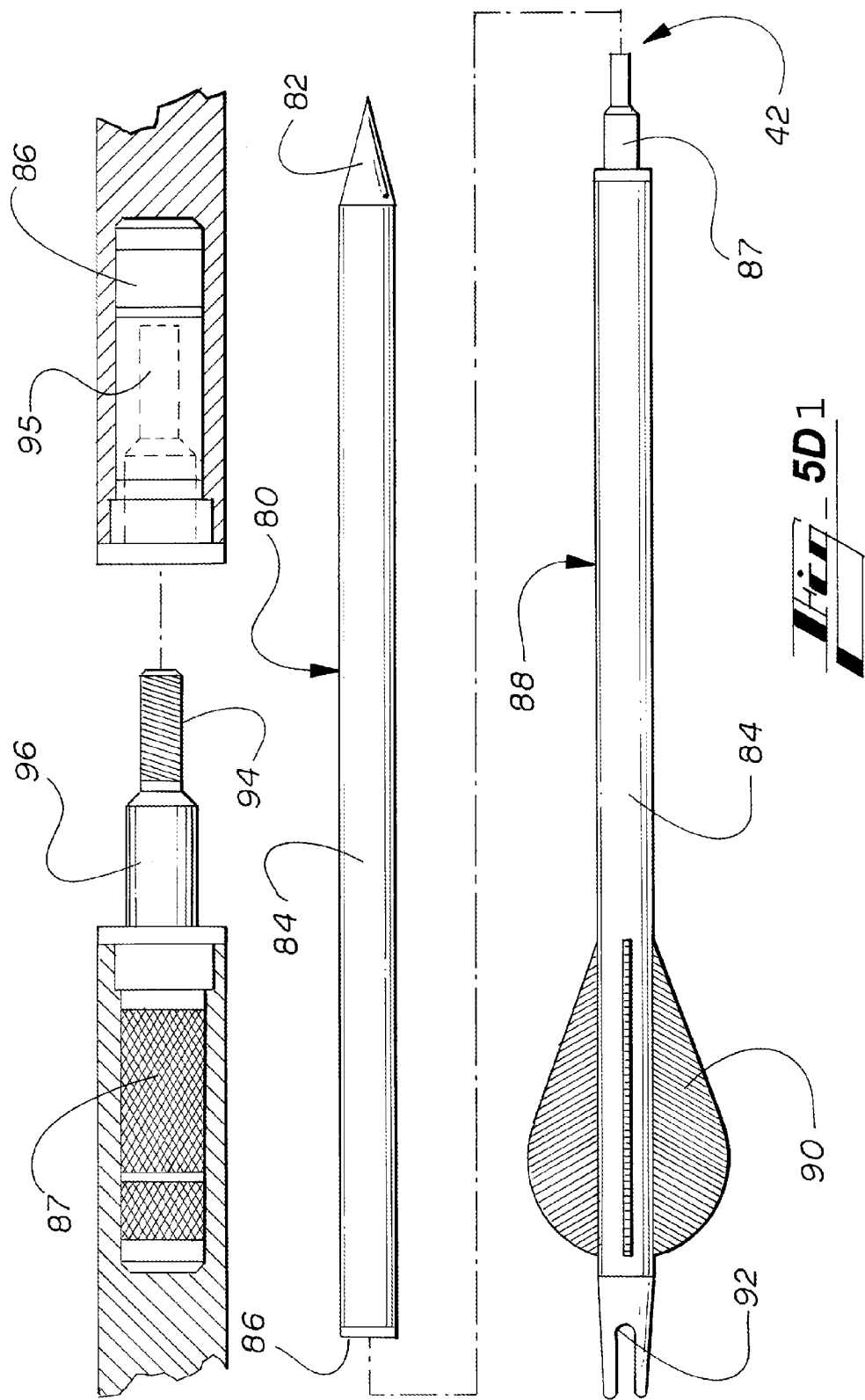

POCKET HUNTING SYSTEM

FIELD

This disclosure pertains to the field of hunting and fishing, specifically hunting and fishing with use of arrows and a slingshot.

BACKGROUND

An individual venturing in the outdoors would benefit from outdoor self reliance and survival training. One aspect of this training is the goal of any adventurer to carry a minimal amount of gear needed to survive or to be self reliant. By minimal gear, it is envisioned that the amount, weight, and volume of gear is considered. Another aspect of this training is the goal to acquire food from the environment.

Acquiring food from the environment is preferable to carrying food. As the number of days in the environment increases carrying sufficient amounts of food, especially meat, becomes increasingly more challenging. Also carrying food limits the amount, weight and volume of other gear.

Hunting tools which aid in obtaining food are typically preferable to carrying food. Hunting tools may allow an adventurer to acquire more food in the wilderness than the amount of food the adventurer could carry. Hunting tools may also simplify the number of pieces of gear needed by the adventurer. Hunting tools may also weight less and require less space than the amount of food acquired by use of the hunting tools.

Reusable tools are typically preferable. Some hunting tools, for example bullets, are not reusable and may limit the relevance of certain hunting tools, such as guns. Compact tools are also typically preferable. Some hunting tools, for example bows, are generally bulky and may limit the amount, weight and volume of other gear available to the adventurer. Multifunctional tools are generally preferable. Any tool which performs multiple functions limits the need for additional pieces of gear.

SUMMARY

The present disclosure includes a slingshot adapter comprising a plastic body, wherein the body includes plastic reinforcing ribs, wherein the body includes a first part and a second part, the body defining a bolt screw aperture, the bolt screw aperture configured to receive a bolt screw, wherein the bolt screw fastens the first part to the second part, the first part and the second part configured to fasten together around the frame of a slingshot, wherein the body defines slingshot frame passageways and slingshot frame apertures in communication with the passageways, wherein the body defines an open orifice, the protrusions defining sight markers, wherein the tips of the protrusions define the open portion of the orifice.

The present disclosure also includes a method of shooting an arrow, the method comprising the steps of providing a slingshot, a slingshot adapter mounted to the slingshot, and an band capable of shooting an arrow, nocking the arrow to the parachute cord loop in the pocket and, locating the arrow within an open orifice of the slingshot adapter, positioning the arrow for shooting by stretching the elastic band, locating a target for the arrow, and releasing the arrow and the elastic band in order to shoot the arrow toward the target.

BRIEF DESCRIPTION OF THE DRAWINGS

The above-mentioned and other features of this disclosure, and the manner of attaining them, will become more apparent and the disclosure itself will be better understood by reference to the following description of embodiments of the disclosure taken in conjunction with the accompanying drawings, wherein:

FIG. 3A is a front view of the slingshot adapter of FIG. 1 with fishing spool attachment in storage position attached to a folding slingshot in folded position;

FIG. 3B is a side view of the slingshot adapter of FIG. 1 with fishing spool attachment in storage position attached to a folding slingshot in folded position;

FIG. 4 is a perspective view of the slingshot adapter of FIG. 1 without fishing spool attachment and attached to the folding slingshot of FIG. 3;

FIG. 5A is a perspective view of the slingshot adapter in use;

FIG. 5B is a perspective view of the slingshot adapter in use;

FIG. 5C is a perspective view of the slingshot adapter in use;

FIG. 5D1 is an exploded view of multi piece arrow;

FIG. 5D2 is an exploded view of the multi piece arrow of FIG. 5D1;

Figure 1:
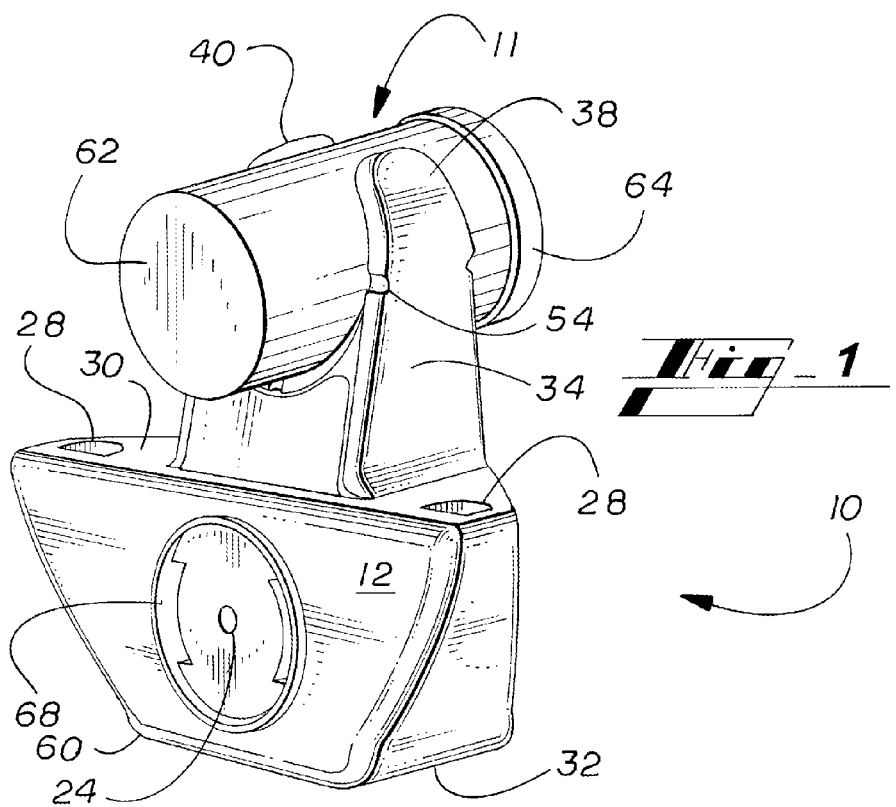
FIG. 1 is a perspective view of a slingshot adapter with fishing spool attachment in storage position.

Corresponding reference characters indicate corresponding parts throughout the several views. Although the drawings represent embodiments of the present disclosure, the drawings are not necessarily to scale and certain features may be exaggerated in order to better illustrate and explain the present disclosure.

DETAILED DESCRIPTION OF THE EXEMPLARY EMBODIMENTS

The embodiments disclosed below are not intended to be exhaustive or limit the disclosure to the precise forms disclosed in the following detailed description. Rather, the embodiments are chosen and described so that others skilled in the art may utilize their teachings.

Slingshot Adapter

FIG. 1 illustrates slingshot adapter 10 including fishing spool attachment 11 in a storage position on slingshot adapter 10. Slingshot adapter 10 includes body 12 which can be made of plastic as well as other materials. Body 12 may be comprised of multiple parts such as first part 15 and second part 16. As slingshot adapter 10 is configured to fasten to a slingshot such as frame 18 of slingshot 20. As illustrated in FIGS. 3-6, slingshot adapter 10 is fastened to Marksman® Folding Slingshot, manufactured and sold by S/R Industries, Inc. and currently available at http://www.marksman.com/3040_slings.php. Slingshot adapter 10 is illustrated to fasten to frame 18 of slingshot 20 by fastening first part 15 and second part 16 together while encircling portions of frame 18 of slingshot 20. As illustrated, slingshot adapter 10 includes bolt screw 22 and body 12 defines bolt screw aperture 24. Specifically body 12 including first part 15 and second part 16 define bolt screw aperture 24.

A process to fasten slingshot adapter 10 to slingshot 20 is as follows. Locating first part 15 adjacent to a first side of frame 18 of slingshot 20 and locating second part 16 adjacent to a second side of frame 18 of slingshot 20. Aligning first part 15 and second part 16 and aligning portions of bolt screw aperture 24 of first part 15 and portions of bolt screw aperture 24 of second part 16, bolt screw 22 fastens first part 15 and second part 16 together by threading along bolt screw aperture 24. Fastening first part 15 and second part 16 together fastens body 12 and therefore slingshot adapter 10 to frame 18 of slingshot 20. It is envisioned that there are multiple equivalent ways to fasten slingshot adapter 10 to slingshot, such as clips, clamps, and even mold forming slingshot adapter 10 during manufacture of slingshot 20.

Figure 7:
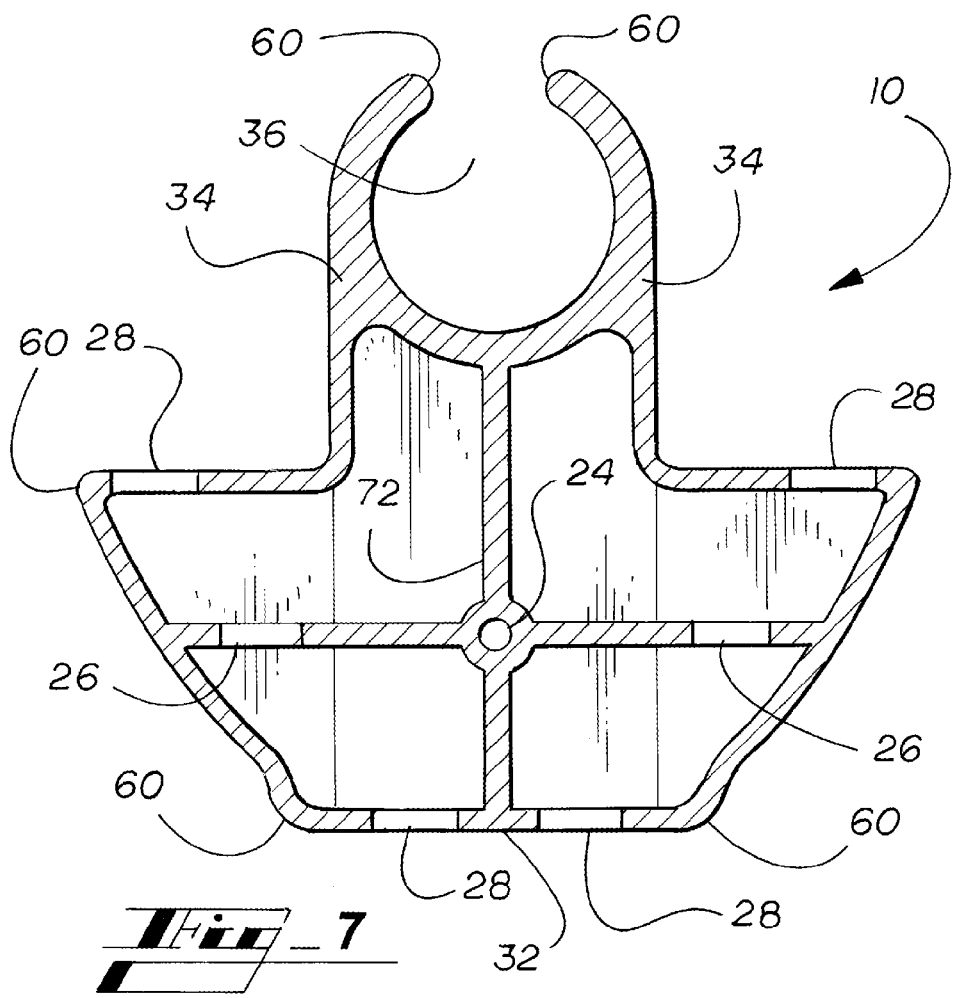
FIG. 7 is a cross sectional view of the slingshot adapter of FIG. 6.

Body 12 also includes reinforcing ribs 72 (FIG. 7) in the interior of body 12. Reinforcing ribs 72 support the structure of slingshot adapter 10 without adding much additional weight. Square cross sectional configurations of reinforcing ribs 72 are illustrated in FIG. 7 though other configurations are envisioned. Reinforcing ribs 72 also define bolt screw aperture 24 and slingshot frame passageways 26. Slingshot adapter 10 defines slingshot frame passageways to provide space for frame 18 of slingshot 20. Slingshot adapter 10 also defines slingshot frame apertures 28 in communication with slingshot frame passageways 26 which allows frame 18 to extend out of top portions 30 and bottom portions 32 of slingshot adapter 10.

As part of the process of fastening slingshot adapter 10 to frame 18 of slingshot 20, slingshot adapter 10 provides a snug fit to frame 18 of slingshot 20. First part 15 and second part 16 are reversible meaning that either first part 15 can be closer to the user 58 while second part 16 is closer to the target or second part 16 can be closer to the user while first part 15 is closer to the target.

Body 12 of slingshot adapter 10 includes protrusions 34 which define open orifice 36. Protrusions 34 include curved features 38 and rounded tips 40. Rounded edges 60, such as rounded tips 40, encourages storage without puncturing or damaging other stored gear. Curved features 38 and rounded tips 40 also aid in defining open orifice 36 as a site for arrow 42 (FIGS. 3-5). Protrusions 34 also define sight markers 54.

Figure 2:
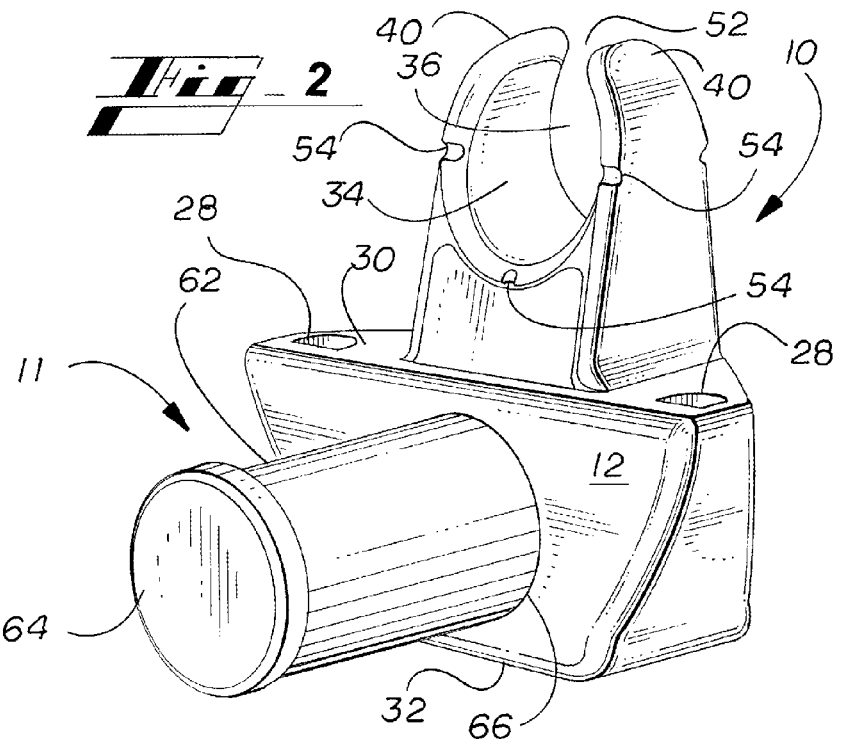
FIG. 2 is a perspective view of the slingshot adapter of FIG. 1 with fishing spool attachment in a useful position.

As illustrated in FIG. 1, curved features 38 and rounded tips 40 aid in defining open orifice 36 as a storing area for fishing spool attachment 11. Fishing spool attachment 11 includes container 62 for storing gear, lid 64 for container 62, and interface 66 for attaching fishing spool attachment 11 to slingshot adapter 10. Specifically, and as best illustrated by FIG. 2, slingshot adapter 10 defines fishing spool aperture 68 on either first part 15 or second part 16. As illustrated fishing spool aperture 68 is circular and coaxial with bolt screw aperture 24. Similarly, fishing spool attachment 11 is illustrated as generally cylindrical and generally the same diameter as fishing spool aperture 68. Fishing spool attachment interface 66 is configured to mount to slingshot adapter 10 by use of fishing spool aperture 68 as illustrated in FIG. 2.

FIG. 3 illustrates a configuration for slingshot 20 and slingshot adapter 10 with fishing spool attachment 11. In this configuration, this hunting tool embodies a number of beneficial aspects. First, this configuration is for storing slingshot 20 and slingshot adapter 10. This configuration may be characterized as compact relative to other comparable hunting tools. As previously discussed, compact tools are also typically preferable. While compact this combination of slingshot 20 and slingshot adapter 10 may be characterized as a multifunctional hunting tool. As previously discussed, multifunctional tools are generally preferable. Any tool which performs multiple functions limits the need for additional pieces of gear. Furthermore, any multifunctional tool with a compact configuration for storage is also generally preferable.

As illustrated in FIG. 4, slingshot adapter 10 is configured to function as a hunting tool along with arrow 42. Arrow 42 encompasses a multitude of shafts, arrowheads, and fletchings. Shafts may be made of wood, fiberglass, aluminum, alloy, carbon fiber, and/or composite materials. Arrowheads encompass many terms such as bodkin points, blunts, judo points, broadheads, target points, field points and/or safety arrows. Fletchings may be made of feather, plastic, wood, fiberglass, aluminum, alloy, carbon fiber, and/or composite materials. It is envisioned that slingshot adapter 10 can be used with all types of arrows. Multiple piece arrows 42 are beneficial and are described in greater detail below.

In operation, the function of slingshot 20 has been modified by use of bands 44, arrow 42 and open orifice 36 as a sighting and aiming tool. Bands 44 of many different types are envisioned such as bands 44 made of latex-rubber. Optionally carbon black jacket 46 may be added to bands 44 made of latex-rubber in order to minimize premature wear and tear on bands 44 due to ultraviolet radiation. Bands 44 may also include arrow adapter 48 such as leather pouch 49 and parachute cord draw loop 51. Open orifice 36 allows user 58 to insert arrow 42 from above slingshot adapter 10 without having to draw arrow 42 back. Open orifice 36 also allows for some flexibility in storing fishing spool attachment 11.

As best illustrated in FIGS. 5A, 5B, and 5C, the steps of shooting arrow 42 using slingshot 20, slingshot adapter 10 and elastic band 44 are described in detail as follows. Similar to a use of a typical bow and arrow, user 58 contacts arrow 42 with elastic band 44 by use of arrow adapter 48. Arrow adapter 48 includes pouch 49 with parachute cord 51. User 58 may notch nock 92 (FIG. 5D) of arrow 42 in cord 51 as best illustrated in FIG. 5A. As used throughout this disclosure, nock 92 is the slot in the rearward portion of arrow 42 while notch is used to define the process of preparing an arrow for a shot. User 58 then locates arrow 42 within open orifice 36 by any number of methods. For example, user 58 may translate a portion of arrow 42 through open portion 52 of open orifice 36. Similar to use of a typically bow and arrow, user 58 may pull back on elastic band 44, specifically cord 51. As best illustrated in FIG. 5B, pulling back on cord 51, causes pouch 49 to grab arrow 42. User 58 is then positioned to locate arrow 42 within open orifice 36 and/or to position arrow 42 for shooting. As is typical for use of a bow and arrow or slingshot, user 58 locates a target for arrow 42. User 58 may utilize sight markers 54 to aim arrow 42 before releasing elastic band 44 in order to shoot arrow 42 toward target 56.

As best illustrated in FIGS. 5D and 5D1, arrow 42 is shown as multi piece arrow 42 including arrowhead portion 80. Arrowhead portion 80 includes arrowhead 82, shaft 84 and female connector portion 86. It is envisioned that either Fletchings portion 88 includes male connector portion 87 complimentary to female connector portion 86, shaft 84, fletchings 90, and notch 92. FIG. 5C illustrates a three piece arrow 42 with an additional shaft portion with female and male connector portions 86 and 87 respectively.

Connector portions 86 and 87 are illustrated in greater detail in FIG. 5D1. Each of connector portions 86 and 87 are mounted in shafts 84. Connector portions 86 and 87 each have complimentary features which aid in creating a tight fit. Specifically, thread 94 on male connector portion 87 is designed to mate with threads 95 within female connector portion 86. Many sizes and dimensions of threads are envisioned, such as 8-32 thread. Also, male connection portion 87 includes shoulder 96 which aids in proper alignment of multiple piece arrow 42.

Figure 5E:
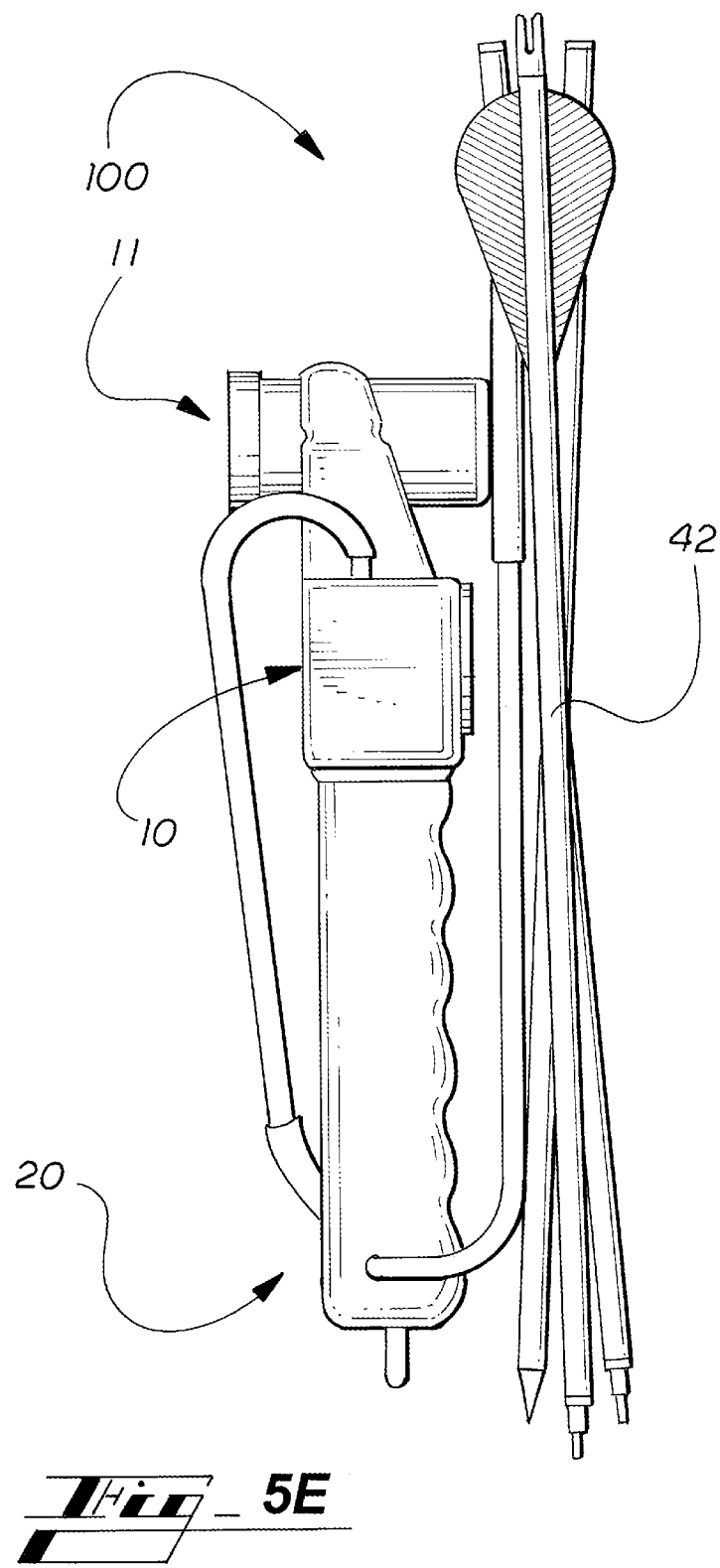
FIG. 5E is a perspective view of pocket hunting kit.
Figure 6:
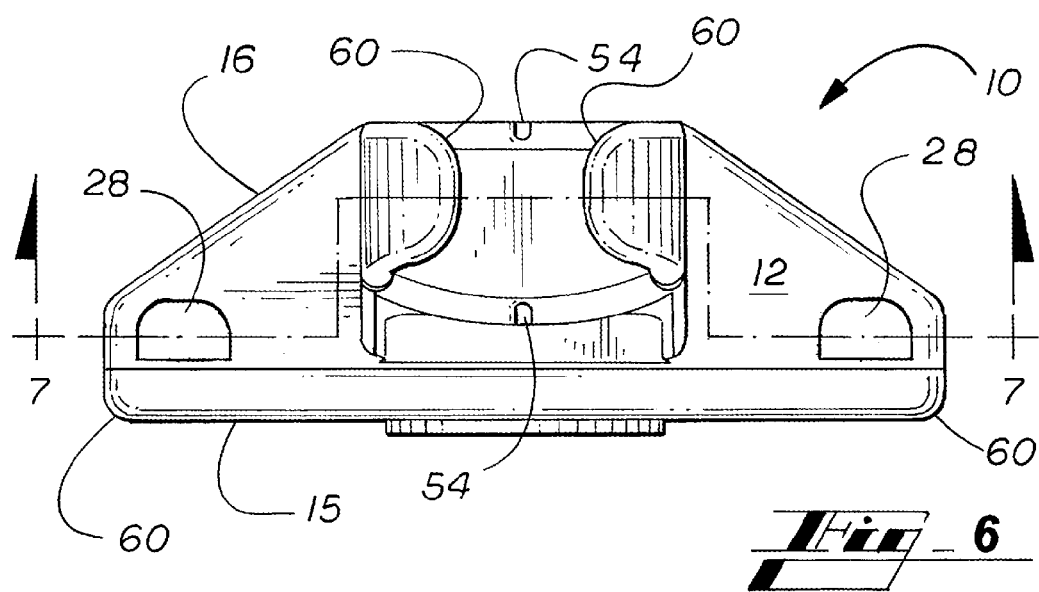
FIG. 6 is a top view of the slingshot adapter without fishing spool attachment.

As best illustrated in FIG. 5E, pocket hunting kit 100 is shown to include folding slingshot 20 with slingshot adapter 10, fishing spool attachment 11 and multiple piece arrow 42. Pocket hunting kit 100 is illustrated in a compact configuration. As previously described hunting tools such as pocket hunting kit 100 are beneficial to an adventurer for acquiring meat in a compact and reusable configuration In a separate embodiment, slingshot 20 with slingshot adapter 10 with fishing spool attachment 11 can also function for fishing (also described as spear-fishing or surface fishing). As best illustrated in FIG. 6, previous disclosure regarding use of slingshot 20 and slingshot adapter 10 is relevant. Aspects specific to this embodiment will be discussed in greater detail. In operation, string 70, such as fishing line, may be tied off to frame 18 of slingshot 20 or user 58 or something stationary, wound around fishing spool attachment 11, and attached to arrow 42.

While this disclosure has been described as having an exemplary design, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

What is claimed is:

1. A slingshot adapter comprising:
    a plastic body, wherein the body includes plastic reinforcing ribs, wherein the body includes a first part and a second part, the body defining a bolt screw aperture,
    the bolt screw aperture configured to receive a bolt screw, wherein the bolt screw fastens the first part to the second part, the first part and the second part configured to fasten together around a frame of a slingshot,
    wherein the body defines slingshot frame passageways and slingshot frame apertures in communication with the passageways,
    wherein the body includes protrusions, wherein the protrusions define an open orifice, the protrusions defining sight markers, wherein tips of the protrusions define the open portion of the orifice.

2. The adapter of claim 1 wherein the first part and the second part combined form the plastic body.

3. The adapter of claim 1 wherein the body is supported by reinforcing ribs.

4. The adapter of claim 3 wherein the reinforcing ribs are on an interior of the body.

5. The adapter of claim 4 wherein the ribs define square cross sections.

6. The adapter of claim 1 wherein the first part includes the bolt screw aperture.

7. The adapter of claim 6 wherein the bolt screw aperture is also defined by the reinforcing ribs of the first part and the second part.

8. The adapter of claim 1 wherein the slingshot passageways and slingshot apertures provide space for the frame of the slingshot.

9. The adapter of claim 1 wherein protrusions of the body defining the orifice include rounded tips.

10. The adapter of claim 1 further comprising a fishing spool attachment, wherein the body defines a fishing spool aperture, the fishing spool aperture configured to receive the fishing spool attachment, the fishing spool aperture radially oriented about the bolt screw aperture.

11. The adapter of claim 10 wherein the fishing spool attachment is configured to mount in the open orifice.

12. The adapter of claim 11, wherein a lateral diameter of the fishing spool attachment is slightly less than a diameter of the open orifice.

13. The adapter of claim 10, wherein the fishing spool attachment defines a container.

14. The adapter of claim 13, wherein the fishing spool attachment includes a lid for the container.

15. The adapter of claim 1 further comprising an elastic band configured to mount to the frame of the slingshot.

16. The adapter of claim 15, wherein the elastic band includes an arrow adapter configured to mount an arrow.

17. The adapter of claim 16, wherein the arrow adapter includes a leather pouch and a parachute cord loop.

18. A method of shooting an arrow, the method comprising the steps of:
    providing a slingshot, a slingshot adapter mounted to the slingshot, wherein the slingshot adapter includes a plastic body, wherein the body includes plastic reinforcing ribs, wherein the body includes a first part and a second part, the first part and the second part configured to fasten together around a frame of the slingshot,
    providing an elastic band capable of shooting an arrow,
    nocking the arrow to a parachute cord loop in a pouch,
    locating the arrow within an open orifice of the slingshot adapter without having to thread the arrow through the open orifice and utilizing target sight markers on the slingshot adapter,
    positioning the arrow for shooting by stretching an elastic band,
    locating a target for the arrow, and
    releasing the arrow and the elastic band in order to shoot the arrow toward the target.

19. The method of claim 18 wherein the step of locating also includes the step of translating the arrow through the open portion of the open orifice.

20. The method of claim 18, wherein protrusions define the sight markers on the slingshot adapter.

21. The method of claim 18, wherein the slingshot includes a rubber band with a leather pouch.

* * * * *